No. 745,910. PATENTED DEC. 1, 1903.
C. F. SAUTTER.
PROPELLING VESSELS.
APPLICATION FILED MAY 12, 1903.
NO MODEL.
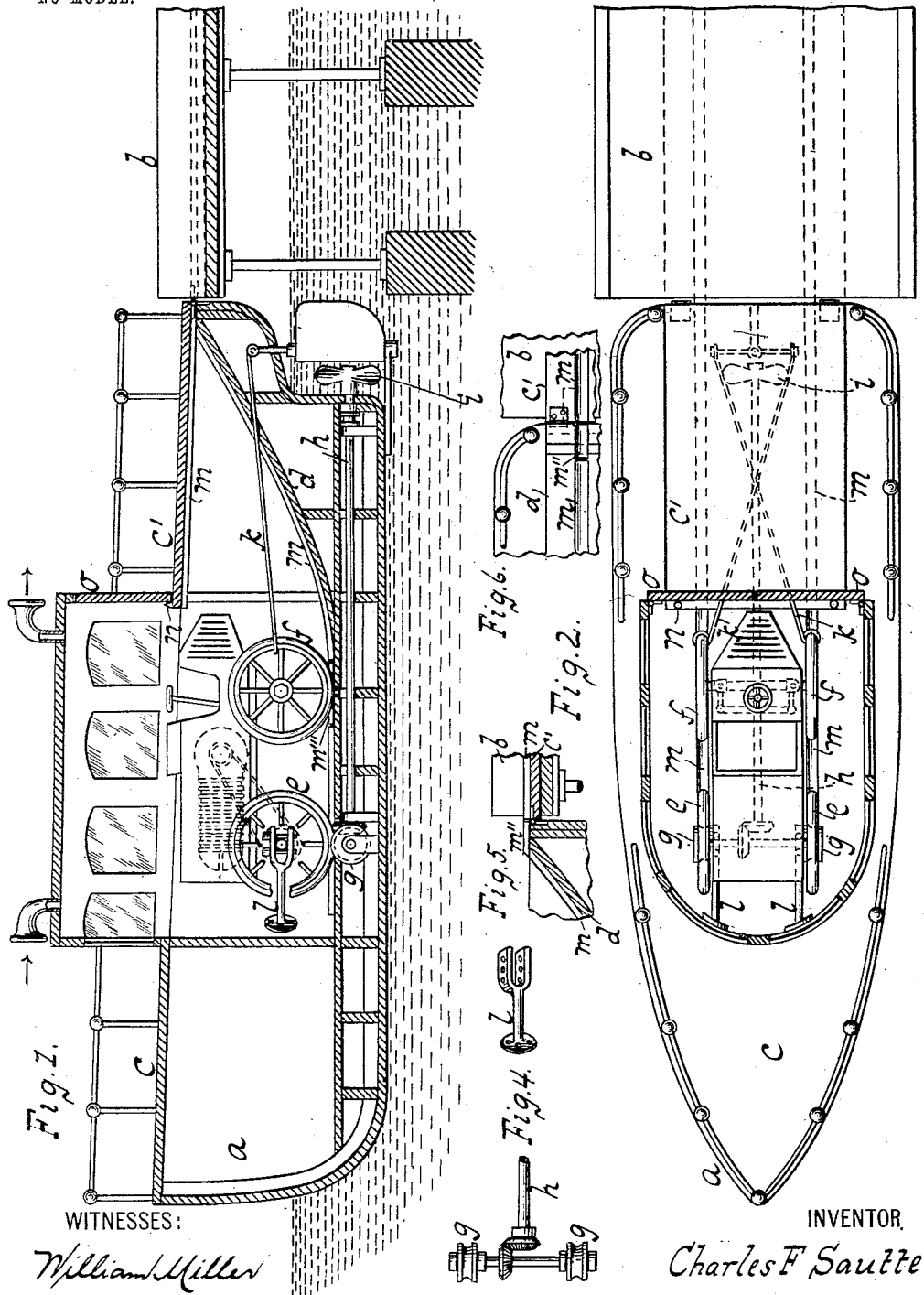
WITNESSES:
William Miller
Chas. E. Poensgen.
INVENTOR
Charles F Sautter
BY
W. C. Hauff
ATTORNEY No. 745,910. Patented December 1, 1903.

UNITED STATES PATENT OFFICE.

CHARLES F. SAUTTER, OF BROOKLYN, NEW YORK.

PROPELLING VESSELS.

SPECIFICATION forming part of Letters Patent No. 745,910, dated December 1, 1903.

Application filed May 12, 1903. Serial No. 156,805. (No model.)

*To all whom it may concern:*

Be it known that I, CHARLES F. SAUTTER, a citizen of the United States, residing at Brooklyn, in the county of Kings and State of New York, have invented new and useful Improvements in Propelling Vessels, of which the following is a specification.

By means of this invention a device such as an automobile, locomobile, or the like can be utilized for marine propulsion.

This invention is set forth in the following specification and claims and illustrated in the annexed drawings, in which—

Figure 1 is a sectional side elevation of a boat or launch embodying this invention. Fig. 2 is a plan view of Fig. 1. Fig. 3 shows miter-gearing at the propelling-shaft. Fig. 4 shows a brace or holding-arm for securing the vehicle. Figs. 5 and 6 show the boat when making a landing and the movable deck-section swung out or to the shore.

The boat or launch $a$ is shown with its stern lying to a dock or landing $b$. The deck $c$ of the boat has the after part $c'$ of such deck made movable or hinged, so that it can be swung back on the dock to serve as a gangplank. An inclined way $d$ leads from the stern into the hold of the boat or vessel, so that the automobile can be run into such hold, the hind or driving wheels of the automobile or vehicle being indicated at $e$ and the front or steering wheels at $f$. When braced in position in the vessel, the automobile has its driving-wheels in frictional or gear contact with the gear or friction wheel $g$, connected with the driving-shaft $h$ of a propeller $i$, (or paddle-wheels can be used instead of a propeller.) Upon rotation of the wheels $e$ of the automobile such motion is communicated to wheel $g$, with shaft $h$ and propeller $i$, to drive the vessel.

Any suitable automobile, locomobile, or the like can be used.

The steering-wheels $f$ of the automobile could be suitably hitched by temporary connection to the tiller-ropes $k$ of the rudder of the vessel, so that the automobile can be used both to propel and steer.

In the drawings the vehicle is shown as having been run backward into the vessel; but of course the wheels $g$ could be placed farther astern, and the wheels $e$ of the vehicle when the latter is run forward into the vessel would then again engage the gears $g$. As the vehicle can run backward as well as forward, the propeller can be driven forward or reverse, as desired.

The gears $g$ can be set or adjusted at suitable distances apart to accommodate various widths of vehicle.

The body of the vehicle or the tube incasing its hind or driving axle can be held or secured by suitable braces or arms $l$. The arms are shown forked or adapted to adjustably secure the vehicle, so that the driving-wheels center or properly engage with the friction-gear $g$. The forks $l$ can also be cushioned to form soft bumpers.

The inclined way $d$, as also the under side of the swinging deck part, are shown with rails or gutter-shaped guideways $m$ for the vehicle to be run therealong onto and off the vessel.

The movable deck part is shown with prongs $n$, which when this part is swung outward to bring its track-sections or inner side uppermost will catch or swing down into the dock or landing-spot to securely hold the boat to the landing and also steady the boat for secure landing or running of the vehicle onto and off the boat, thus doing away with the use of ropes, chains, or other fastenings. When the deck is swung back onto the boat, the rail-sections come on the under side or within the boat, and the prongs or catches will be concealed or rest against the inner sides of the doors $o$ of the cabin $p$ when said doors are swung shut. The movable deck-section is thus held closed; but on swinging the cabin-doors open the deck is freed, to be raised or swung out for making the landing. The deck can be raised either by hand or by cogs, pulleys, or other suitable mechanism. When the deck part $c'$ is open, the space formed between the rail on way $d$ and the rail on deck $c'$ can be filled by a movable track-section $m''$ swung or moved temporarily into the gap. The track-sections $m'''$ under the steering-wheels $f$ can also be made swiveling to allow the steering-wheels to move or actuate the rudder.

In place of driving a propeller the vehicle could be used to drive either paddle-wheels or a roller with prongs adapted to catch into ice in case the vessel is to be made in form of an ice-boat.

In place of only one vehicle a series of vehicles can be provided for, the vessel being made of sufficient length and, if seen fit, provided with several propellers.

What I claim as new, and desire to secure by Letters Patent, is—

1. A vessel having a driving-shaft and driving-gear therefor, a way and a swinging deck-section, and tracks on the way and at the under face of the deck-section, so that as the latter is swung open or outward the track-sections at the movable deck are exposed to form a continuation of the track-sections on the way, said tracks registering with the gear for running a vehicle to and from engagement with the gear.

2. A vessel having a driving-shaft and driving-gear therefor, a way and a swinging deck-section, and tracks on the way and at the under face of the deck-section, so that as the latter is swung open or outward the track-sections at the movable deck are exposed to form a continuation of the track-sections on the way, said movable deck-section having prongs or catches for securing a hold and said tracks registering with the gear for running a vehicle to and from engagement with the gear.

3. A vessel comprising a rudder, a driving-shaft and driving-gear, and a track adapted to receive a vehicle and hold the driving-wheels thereof to the gear, said track having pivoted sections to enable the steering-wheels of the vehicle to swing when connected to the rudder.

4. A vessel comprising a driving or propelling shaft, a gear for operating the shaft, and a way or tracks registering with the gear to permit of an automobile or like vehicle to be run to and from engagement with the gear.

5. A vessel comprising a driven shaft, a driving-gear therefor, a way, a swinging deck-section, a rudder, a track arranged in the hold of the vessel and adapted to receive an automobile or like vehicle and hold the driving-wheels thereof to the gear, said track having pivoted sections to enable the steering-wheels of the vehicle to swing when connected to the rudder, and tracks on the way and at the under face of the deck-section so that as the latter is swung open or outward, the tracks carried by the deck-section are adapted to form a continuation of the track on the way, the latter forming a continuation of the track in the hold, substantially as herein shown and described.

In testimony whereof I have hereunto set my hand in the presence of two subscribing witnesses.

CHARLES F. SAUTTER.

Witnesses:
E. F. KASTENHUBER,
CHAS. E. POENSGEN.